UNITED STATES PATENT OFFICE.

HENRY WARREN SHEPARD, OF CAMDEN, NEW JERSEY, ASSIGNOR TO THE UNITED STATES CHEMICAL COMPANY, OF PHILADELPHIA, PENNSYLVANIA.

PROCESS OF MAKING ALUM CAKE.

SPECIFICATION forming part of Letters Patent No. 443,685, dated December 30, 1890.

Application filed July 21, 1888. Serial No. 280,654. (No specimens.)

*To all whom it may concern:*

Be it known that I, HENRY WARREN SHEPARD, of Camden, county of Camden, and State of New Jersey, have invented a new and useful Improvement in the Manufacture of Aluminous Cake, of which the following is a true and exact description.

My invention relates to the manufacture of a white aluminous cake from aluminous materials (preferably bauxite) containing iron. In many processes heretofore patented and described in printed publications methods of treatment involving the use of alkaline or alkaline earthy sulphides to reduce the peroxide of iron to the colorless protoxide have been suggested. My improvement belongs to this class of processes, and has for its object to at the same time reduce the cost of the treatment and improve the quality of the commercial product. I have discovered that by carefully proportioning the acid with which bauxite or other clay is treated to convert its alumina into sulphate of alumina, so that the resulting sulphate shall be thoroughly neutral or preferably somewhat basic, and then adding to the hot semi-fluid mass which results from the treatment an alkaline or alkaline earthy sulphide in quantity sufficient to reduce the peroxide to protoxide, a comparatively small quantity of the reducing agent is required to completely decolorize the cake, and the cost of the treatment is therefore greatly less than where the alkaline sulphides are used with an acid solution, in which last case they are so rapidly decomposed as to render them but partly effective. When the action of the sulphide is complete, I run the hot crude mass into a settling-tank containing water, so as to dissolve out the sulphate of alumina and allow the insoluble matter to settle. The clear basic solution is drawn off and concentrated by boiling in the usual manner, so that it will harden when cold.

I have in carrying on the above-described method been enabled to economize its cost very greatly by using an impure calcium sulphide as the reducing agent, which is prepared and used in the following manner:

I take the impure sulphate of lime, ($CaSO_4$,) which is a refuse in the manufacture of tartar, and roast it in the presence of coal, so as to produce an impure calcium sulphide ($CaS$.) This impure calcium sulphide I add to the basic mass of aluminous cake produced by treating the bauxite with sulphuric acid, as above described, and then dissolve out the decolorized sulphate of alumina, separate it from the insoluble matter, and concentrate it, as aforesaid.

The impurities of the calcium sulphide are, I have found, entirely eliminated by the treatment, and the resulting cake of sulphate of alumina is as pure and valuable as though made from pure alkaline sulphides.

The steps used by me in the practical carrying out of my invention are as follows: Into a leaden-jacket kettle sulphuric acid from 49° to 50° Baumé, is introduced and heated to about 200° Fahrenheit. I then add the finely-ground aluminous material (preferably bauxite) in amount depending on the amount of alumina which the clay contains and carefully regulated, so as to insure an excess of alumina and consequently a basic sulphate of alumina as a result of its treatment with the acid. When the action of the acid, is complete and while the resultant mass is in the hot fluid state, add about four per cent. of the impure calcium sulphide, prepared as above described and mixed with water to about the consistency of cream, taking care that the sulphide is thoroughly mixed by agitation or otherwise with the hot pasty mass. The reaction which then takes place is expressed in the following equation, viz: $Fe_2(SO_4)_3 + CaS = 2FeSO_4 + CaSOS$, and in the basic solution the action is sufficiently prolonged to insure the entire reduction of the peroxide. The dissolving out of the sulphate of alumina, as already mentioned, frees it from the impurities of the calcium sulphide, as well as from those of the clay, and the remaining treatments are identical with those generally in use.

The use of alkaline sulphides in the manufacture of alum has been found objectionable, owing to a discoloration of the alum, which is apt to result from the use of an excess of the sulphide. By using the alkaline sulphide in the stage of the manufacture of the cake described this difficulty is avoided, as all the reducing-gases which are not taken up by peroxide of iron are driven off by the heat or escape during the subsequent dissolving out of the alum. This and the feasibility of using the impure sulphides are marked features of advantage in my new method.

Having now described my invention, what I claim, and desire to secure by Letters Patent is—

1. The herein-described method of manufacturing aluminous cake, which consists in adding to sulphuric acid bauxite or other aluminous material in quantity sufficient to form basic sulphate of alumina, adding to the hot pasty mass resulting an alkaline or alkaline earthy sulphide and mixing the same therewith in quantity sufficient to reduce the soluble iron in the mixture to the ferrous state, diluting the mass with water, separating the dissolved sulphate from the insoluble impurities of the mixture, and concentrating the solution to form the commercial aluminous cake.

2. The herein-described method of manufacturing aluminous cake, which consists in adding to sulphuric acid bauxite or other aluminous material in quantity sufficient to form basic sulphate of alumina, adding to the hot pasty mass resulting an impure calcium sulphide and mixing the same therewith in quantity sufficient to reduce the soluble iron in the mixture to the ferrous state, diluting the mass with water, separating the dissolved sulphate from the insoluble impurities of the mixture, and concentrating the solution to form the commercial aluminous cake.

HENRY WARREN SHEPARD.

Witnesses:
WM. J. JORDAN,
E. R. JENKS.